US009628851B2

(12) United States Patent
Hu et al.

(10) Patent No.: US 9,628,851 B2
(45) Date of Patent: Apr. 18, 2017

(54) AUTOMATIC SYNCHRONIZATION OF AUDIO AND VIDEO BASED MEDIA SERVICES OF MEDIA CONTENT

(75) Inventors: Carl Chun-Hei Hu, Carmel, IN (US); James Alan Strothmann, Zionsville, IN (US)

(73) Assignee: Thomson Licensing, Issy les moulineaux (FR)

( * ) Notice: Subject to any disclaimer, the term of this patent is extended or adjusted under 35 U.S.C. 154(b) by 828 days.

(21) Appl. No.: 10/544,577

(22) PCT Filed: Feb. 14, 2003

(86) PCT No.: PCT/US03/04527
§ 371 (c)(1),
(2), (4) Date: Aug. 5, 2005

(87) PCT Pub. No.: WO2004/075565
PCT Pub. Date: Sep. 2, 2004

(65) Prior Publication Data
US 2006/0156374 A1    Jul. 13, 2006

(51) Int. Cl.
| H04N 7/173 | (2011.01) |
| H04N 9/475 | (2006.01) |
| H04N 7/16 | (2011.01) |
| H04N 21/439 | (2011.01) |
| H04N 21/43 | (2011.01) |

(Continued)

(52) U.S. Cl.
CPC ......... H04N 21/4394 (2013.01); H04N 7/163 (2013.01); H04N 21/4307 (2013.01); H04N 21/443 (2013.01); H04N 21/4622 (2013.01)

(58) Field of Classification Search
CPC ....... H04N 21/4307; H04N 21/4312–21/4314; H04N 21/4325; H04N 21/4334; H04N 7/163

USPC ......... 725/135, 90, 109; 348/512, 515, 485; 386/230–231

See application file for complete search history.

(56) References Cited

U.S. PATENT DOCUMENTS 5,585,858 A * 12/1996 Harper et al. ................. 348/485
5,912,701 A *  6/1999 Morton, Jr. ............. H04L 29/06
                                                      348/192
6,184,937 B1   2/2001 Williams et al.
(Continued)

FOREIGN PATENT DOCUMENTS

| JP | 2002-297200 | 10/2002 |
| WO | WO 02/060181 | 8/2002 |
| WO | WO 02/073593 A1 | 9/2002 |

OTHER PUBLICATIONS

Search Report Dated Jun. 2, 2003.

*Primary Examiner* — Brian T Pendleton
*Assistant Examiner* — Alan Luong
(74) *Attorney, Agent, or Firm* — Brian J. Dorini; Reitseng Lin

(57) ABSTRACT

There is provided a method for automatically synchronizing playback between a first media service and a second media service, both services corresponding to the same media content source. Common audio events in the first media service and the second media service are matched. A playback timing of at least one of the first media service and the second media service is adjusted, based on a result of the matching step, so as to automatically synchronize the playback between the first media service and the second media service.

19 Claims, 4 Drawing Sheets

(51) Int. Cl.
*H04N 21/443* (2011.01)
*H04N 21/462* (2011.01)

(56) References Cited

U.S. PATENT DOCUMENTS

| | | | |
|---|---|---|---|
| 6,429,902 B1* | 8/2002 | Har-Chen et al. | 348/518 |
| 6,630,963 B1* | 10/2003 | Billmaier | H04H 20/18 |
| | | | 348/485 |
| 2003/0028796 A1* | 2/2003 | Roberts et al. | 713/193 |
| 2003/0066089 A1* | 4/2003 | Andersen | H04N 7/17318 |
| | | | 725/112 |

* cited by examiner

US 9,628,851 B2

AUTOMATIC SYNCHRONIZATION OF AUDIO AND VIDEO BASED MEDIA SERVICES OF MEDIA CONTENT

This application claims the benefit, under 35 U.S.C. §365 of International Application PCT/US03/04527, filed Feb. 14, 2003, which was published in accordance with PCT Article 21(2) on Sep. 2, 2004 in English.

FIELD OF THE INVENTION

The present invention generally relates to the presentation of media services (e.g., audio and/or video) to a user and, more particularly, to the synchronization in playing back an audio based and a video based media service irrespective of time markers, if any, embedded in the media services.

BACKGROUND OF THE INVENTION

With the availability of different media services presenting the same media content (e.g., a sporting event), a multimedia user may want to view a video based media service from one authoring source while listening an audio based media service from a second authoring source. The video based media service represents a nationally televised broadcast of a sporting event, and the audio based media service represents a local radio broadcast of the same sporting event. There may be a perceivable delay between the playing of both media services, because of differences in the respective broadcasting timelines of each media service (due to, e.g., different delays introduced in the creation or broadcast of the media services).

"Lip-synching" is an effect that results from a similar synchronization problem, but deals with the playback of media services from the same authoring and content source. Traditional solutions involve inserting information into the audio and video media services representing the media content, which may be analog or digital, providing time markers for aligning the media services for presentation. Specialized reception equipment then synchronizes the audio and video media services based on the supplied time markers, minimizing the lip-synching effect. Many media services however do not have time markers available for reducing the lip-synching effect.

Accordingly, it would be advantageous to have a method and apparatus for synchronizing media services (e.g., broadcast and/or streaming) from the same or different authoring sources such that the method and apparatus do not rely upon time markers and specialized equipment to processing the supplied time markers.

SUMMARY OF THE INVENTION

According to an aspect of the present invention, there is provided a method for automatically synchronizing a playback between a video media service and an audio media service corresponding to the same media content but from different authoring sources. Common characteristics in the waveform of audio corresponding to the video media service and the audio media service are matched. A playback timing of at least one of the video media service and the audio media service is adjusted, based on a result of the matching step, so as to automatically synchronize the playback between the video media service and the audio media service.

According to another aspect of the present invention, there is provided an apparatus for automatically synchronizing a playback between a video media service and an audio media service corresponding to the same media content but from different authoring sources. A sound-matching device matches common audio characteristics in the audio waveform corresponding to the video media service and the audio media service, respectively. A variable delayer adjusts a playback timing of at least one of the video media service and the audio media service, based on an output of the sound-matching device, so as to automatically synchronize the playback between the video media service and the audio media service.

These and other aspects, features and advantages of the present invention will become apparent from the following detailed description of preferred embodiments, which is to be read in connection with the accompanying drawings.

DETAILED DESCRIPTION OF THE INVENTION

Figure 1:
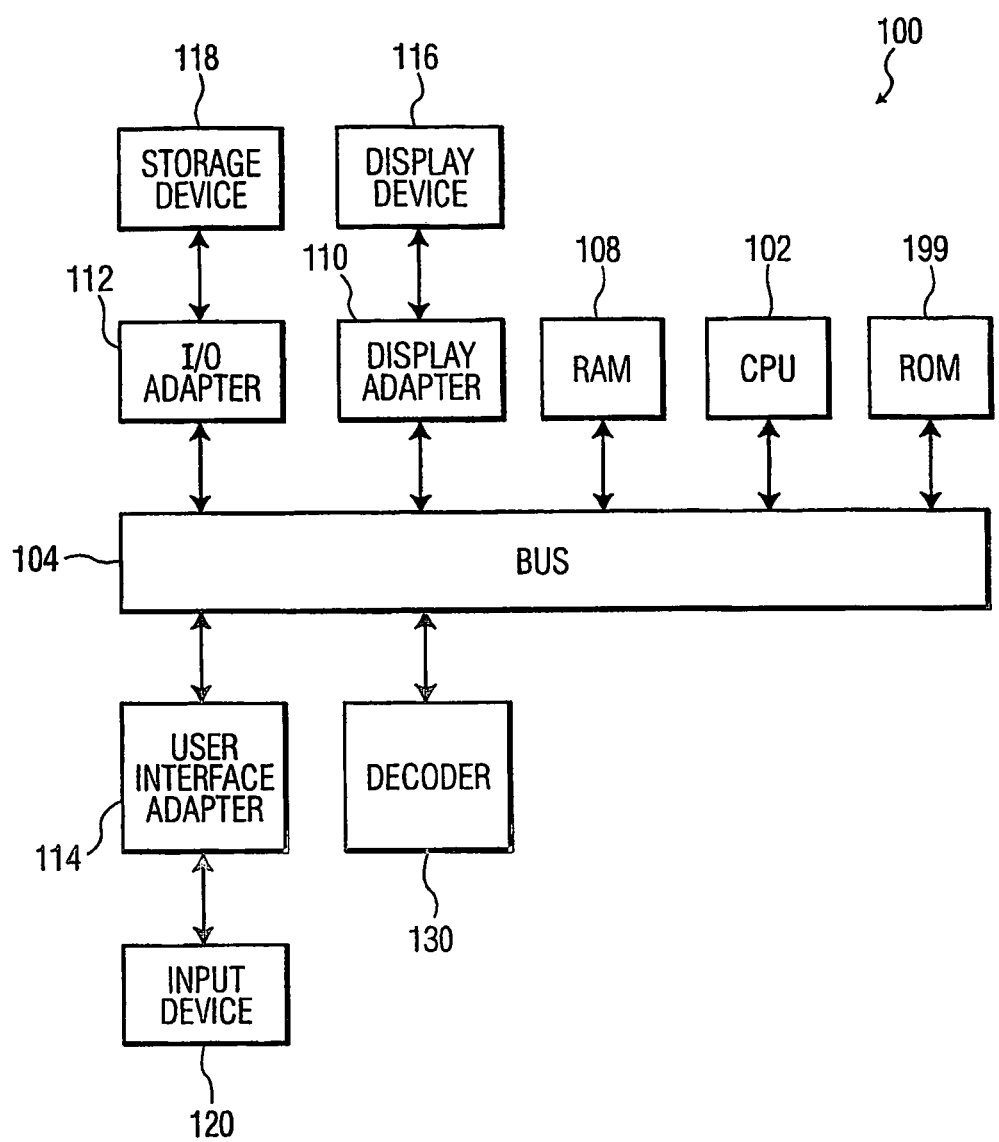
FIG. 1 is a block diagram illustrating a computer processing system 100 for implementing automatic synchronization of media services, according to an illustrative embodiment of the present invention.

The present invention is directed to a method and apparatus for synchronizing media services from different authoring sources (e.g., broadcasted media, streamed media, and the like) without regard to embedded time markers. It is to be appreciated that the present invention may also be readily employed to synchronize only broadcast content or only streaming content in the case of two media services from the same authoring source. Moreover, the present invention may be employed to synchronize other types of media services as readily determined by one of ordinary skill in the related art. In a preferred embodiment of the present invention, the present invention may be employed to synchronize a video media service from a television broadcast with an audio media service from a Satellite audio broadcast, both media services are derived from the same media content.

As used herein, the term "media service" includes audio, video, textual, broadcasted programs, multimedia data files, and streaming media. An audio based media service has a corresponding audio signal, and a video based media service has a corresponding video signal. Broadcasted programs comprise services that are capable of being rendered via a radio, television set, or other type of device capable of receiving broadcasted media. Such services are typically broadcasted from a television or radio station through the airwaves, and received through a connection to a cable, satellite, antenna, and any other sort of communications medium capable of delivering radio/television programming. Programming may also be transmitted through a communications network, as the Internet, that renders a media service by a program known as a media browser or player, such as REALONE® or MICROSOFT MEDIA PLAYER®.

Multimedia files comprise any combination of text, image, video, and audio data. It is to be noted that a file consisting of just video or audio data is also to be defined as a multimedia file. Streaming media comprises audio, video, multimedia, textual, and interactive data files that are delivered to a user's computer via the Internet or other communications network environment that may play on the user's computer/device before delivery of the entire file is completed. One advantage of streaming media is that streaming media files begin to play before the entire file is downloaded, saving users the long wait typically associated with downloading the entire file. Digitally recorded music, movies, previews, news reports, radio broadcasts and live events have all contributed to an increase in streaming content available.

Streaming media is encoded in various formats, examples including REALAUDIO®, REALVIDEO®, REALMEDIA®, APPLE QUICKTIME®, MICROSOFT WINDOWS® MEDIA FORMAT, QUICKTIME®, MPEG-2 LAYER III AUDIO, and MP3®. Typically, media files are designated with extensions (suffixes) indicating compatibility with specific formats. For example, media files (e.g., audio and video files) ending in one of the extensions, ram, .rm, rpm, are compatible with the REALMEDIA® format. Some examples of file extensions and their compatible formats are listed in the following table. A more exhaustive list of media types, extensions and compatible formats may be found at http://www.bowers.cc/extensions2.htm.

The term "authoring source" refers to the source that created a media service. A media service that is created via a broadcaster has a broadcast based authoring source. This implies that the media service was created by a broadcast center (such as a television station or radio station) for transmission over the airwaves, satellite, cable, or the like. Similarly, a media service that is streamed has a streaming based authoring source. Streamed media services may also be received over the airwaves, satellite, cable, or the Internet, but typically streamed files are played back via a streaming media player. With the principles of the present invention, a playback device, such as a television set, computer, and the like, would have the capability of receiving both broadcast created and streamed media services, with the proper rendering software/hardware. The source of a media service does not restrict the playback of a media service. Optionally, authoring sources are be broken down by broadcaster, location, and the format used to transmit a media service. For example, broadcast based authoring sources include ABC, NBC, FOX, CBS, and UPN for media services that are broadcast television programming.

Media content refers to the content that media services are derived from. Examples of media content include songs, political speeches, news broadcasts, movie trailers, live broadcasts, radio broadcasts, financial conference calls, live concerts, sporting events, movies, television, cable programming, web-cam footage, and the like. Typically, several different media services are derived from the same source of media content. For example, a college football game would have an audio and video media service representing a nationally broadcasted television program. The same college football game may also be transmitted as an audio and video media service corresponding to a public access channel for a college. The media services from the national broadcast and public access channel would be different, even though they are from the same media authoring source. Other examples of media content may be used, as consistent with the principles of the present invention.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

FIG. 1 is a block diagram illustrating a computer processing system 100 for implementing automatic synchronization of media services, according to an illustrative embodiment of the present invention. Computer processing system 100, or applicable elements thereof, may be already present in broadcast 200 and streaming authoring sources 250 below or added in accordance with the present invention. It is to be appreciated that computer processing system 100 is also interchangeably referred to herein as "sound-matching device".

Computer processing system 100 includes at least one processor (CPU) 102 operatively coupled to other components via a system bus 104. A read only memory (ROM) 106, a random access memory (RAM) 108, a Read Only Memory (ROM) 199, a display adapter 110, an I/O adapter 112, and a user interface adapter 114, are operatively coupled to the system bus 104.

A display device 116 is operatively coupled to system bus 104 via display adapter 110. A storage device (e.g., a magnetic, optical, and/or other type of storage device) 118 is operatively coupled to system bus 104 by I/O adapter 112.

An input device 120 is operatively coupled to system bus 104 by user interface adapter 114. The input device 120 is used to input and output information to and from system 100, and may include, but is not limited to, a keyboard, a keypad, a mouse, switches, buttons, and so forth.

A decoder 130 is operatively coupled to system bus 104. The decoder 130 receives input signals for processing (e.g., synchronization) such as, for example, broadcast signals and streaming signals. The decoder 130 may perform functions including, but not limited to, analog-to-digital conversion and digital-to-analog conversion. Other functions, as readily determined by one of ordinary skill in the related art, may also be performed by decoder 130. It is to be appreciated that a Digital Sound Processor (DSP) may also be employed in place of computer processing system 100, as is known to those of ordinary skill in the related art.

Figure 2:
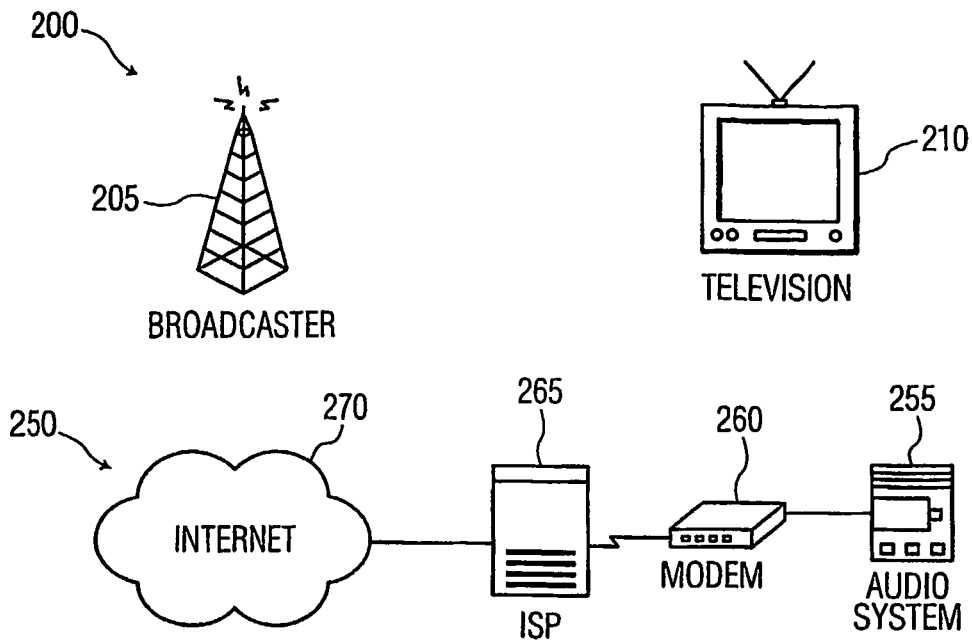
FIG. 2 is a block diagram illustrating a broadcast based authoring source 200 and a streaming based content authoring source 250 to which the present invention may be applied, according to an illustrative embodiment of the present invention.

FIG. 2 is a block diagram illustrating a broadcast based authoring source 200 and a streaming based authoring source 250 to which the present invention may be applied, according to an illustrative embodiment of the present invention. The broadcast authoring source 200 includes a broadcaster 205 and a television 210. The streaming authoring source 250 includes an audio system 255 and a modem 260, the latter connected to an Internet Service Provider (ISP) 265 that, in turn, is connected to the Internet 270. The television 210 and audio system 255 are also referred to herein as "output devices".

Each system has user controls associated with it. Typically, a remote control with an on screen interface are associated with video output devices (e.g., television 210), and a keyboard with display and remote control are associated with audio output devices (e.g., audio system 255).

It is to be appreciated that the present invention is not limited to the exact configurations of the preceding broadcast and streaming authoring sources and, thus, other configurations of such systems (as well as other types of systems) may also be employed in accordance with the present invention. As is evident to one of ordinary skill in the art, a broadcast and/or streaming authoring source to be employed with the present invention should include a receiver, a decoder, and an output device. The receiver receives content. The decoder decodes the content. The output device presents the decoded content to the user. It is also possible to have a single system capable of receiving, decoding, and outputting two or more different types of content (e.g., broadcast and streaming (e.g., IP) content). An example of a combined system would be an Internet television.

According to an illustrative embodiment of the present invention, a user is watching a broadcast sports event on television and listening to audio commentary about that same event from a live Internet streaming broadcast. The broadcasted sports event is representative of media content. The sports event televised on television represents a video media service with a broadcast authoring source having a corresponding audio waveform representing the audio of the television broadcast. The audio commentary from the Internet is an audio based media service from a streamed authoring source.

Due to delays in the transmission and processing of both media services the two scenarios, synchronization of the two media services may need to be adjusted to provide a nondisruptive viewing/listening experience. The user will be able to adjust the relative timing of the two programs to provide an acceptable match. This adjustment may be performed manually by the user, automatically, or a combination thereof. For example, in the last case, the present invention may be used to perform automatic synchronization of media services while allowing the user to fine tune the results of the automatic synchronization. The systems/devices will hold the determined delays until a media service is changed.

Figure 3:
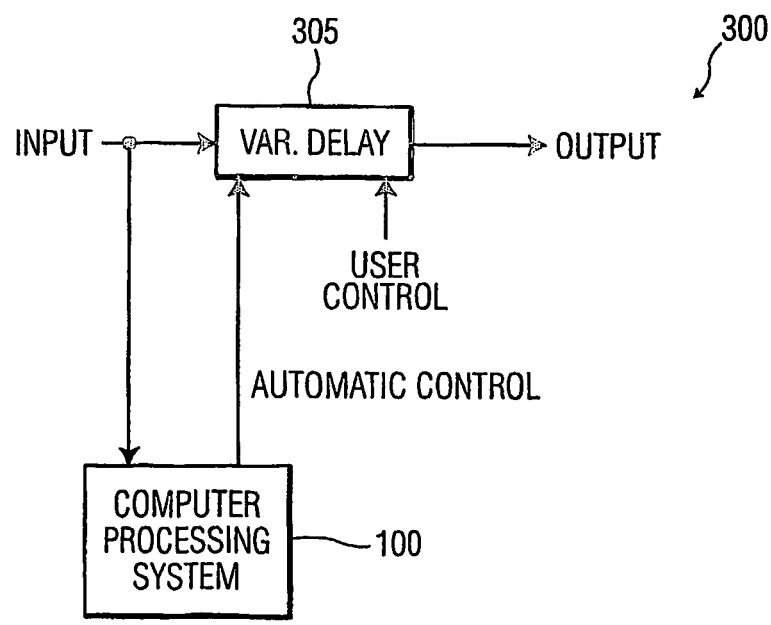
FIG. 3 is a block diagram illustrating a synchronization apparatus 300 for synchronizing media services of the same media content, according to an illustrative embodiment of the present invention.

FIG. 3 is a block diagram illustrating a synchronization apparatus 300 for synchronizing media services, according to an illustrative embodiment of the present invention. The synchronization apparatus 300 includes an adjustable delay line 305 responsive to user and/or automatic control. Automatic control is provided by the computer processing system 100 shown in FIG. 1. In embodiments of the present invention in which automatic control is not to be used, then the computer processing system 100 may be omitted from synchronization apparatus 300. Given the teachings of the present invention provided herein, one of ordinary skill in the related art may contemplate these and various other configurations of synchronization apparatus 300.

The adjustable delay line 305 is inserted into either or both of the broadcast authoring source 200 and the streaming authoring source 250. The delay line 305 should be capable of inserting delays from zero to several seconds (or more). In authoring sources where buffers are already used, increasing the size of the buffer to span an appropriate time interval of content and adding a mechanism to adjust the delay may be employed.

The user and/or automatic control allows for increases or decreases to the relative delays. The present invention may employ individual control of each delay line, or a common control that simultaneously increases one delay line and decreases the other delay.

A further description will now given of manual user control, according to illustrative embodiments of the present invention. In one illustrative embodiment of the present invention, the user is presented with a control on each output device (e.g., television 210 and audio system 255) to adjust the delay of the output of that device. By manually tuning the controls, the user may achieve an acceptable synchronization between media services. Although the delay is described in this example as existing on both output devices, in other embodiments of the present invention the delay control may on any device. In another illustrative embodiment of the present invention, in the case of a device capable of receiving a media service from a broadcast source and a media service from a streaming source (e.g., an Internet television), the user control will advance one media service and delay the media service simultaneously. The user control may have a control range of (media service A max advance, media service B max delay) to (media service A max delay, media service B max advance). It is to be appreciated that the present invention is not limited to the preceding implementations with respect to manual user control and, thus, other implementations may be readily employed in accordance with the present invention while maintaining the spirit and scope of the present invention.

A further description will now given of automatic user control, according to illustrative embodiments of the present invention. In one illustrative embodiment of the present invention, a system that receives both types of content (broadcast and streaming) a user activates a synchronization mechanism. The user control in this case may be a "synchronize/return to default" button. When the "synchronize/return to default" button is activated, an automatic synchronization mechanism synchronizes the contents. Of course, other configurations are possible as readily contemplated by one of ordinary skill in the related art.

Automatic synchronization may be based on, but is not limited to, noise envelope matching, audio fingerprint matching, and embedded meta data tags, as described below.

In a noise envelope matching approach, the processed overall noise envelope of the audio waveforms of audio based media services are matched. The theory of operation centers on matching up distinct audio characteristics in each waveform via a digital processing techniques. For example, the crowd noise in each audio stream (hereafter, the term audio stream or stream refers to the audio of a media service or an audio waveform corresponding to a media service) of an event is used to achieve synchronization. Wide band background audio characteristics are analyzed in both streams. A correlation process Is performed in the time domain to determine the relative delay between the audio streams. After the delay is determined, an adjustment(s) is made to the presentation of audio/video.

Audio characteristics are to be defined as audio parameters that are used to define physical attributes of an audio waveform such as frequency, gain, waveform amplitude, gain, and the like. One skilled in the art may choose one or more criteria to define the audio characteristics of the audio waveform to be analyzed for the matching of audio media services. The waveforms may be filtered to further define audio characteristics using digital signal processing techniques.

Figure 4:
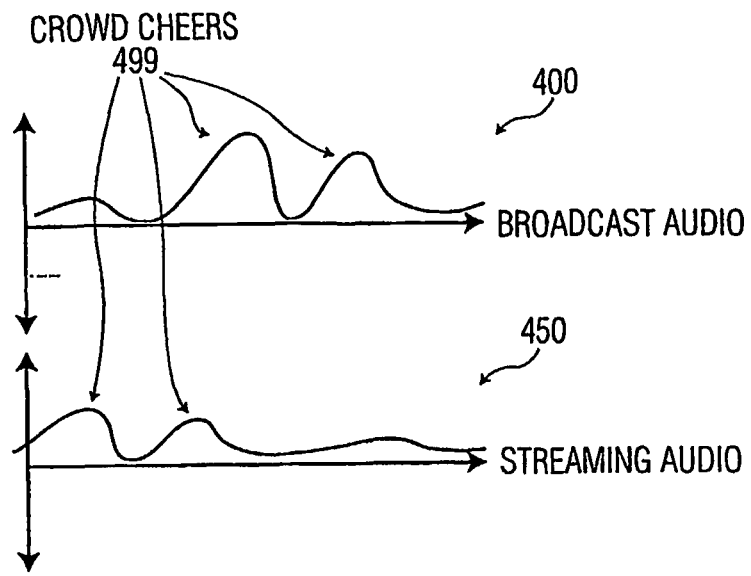
FIG. 4 is a diagram illustrating the spectral energy of a broadcast audio stream 400 and a streaming audio stream 450 both corresponding to the same media content, according to an illustrative embodiment of the present invention.
Figure 5:
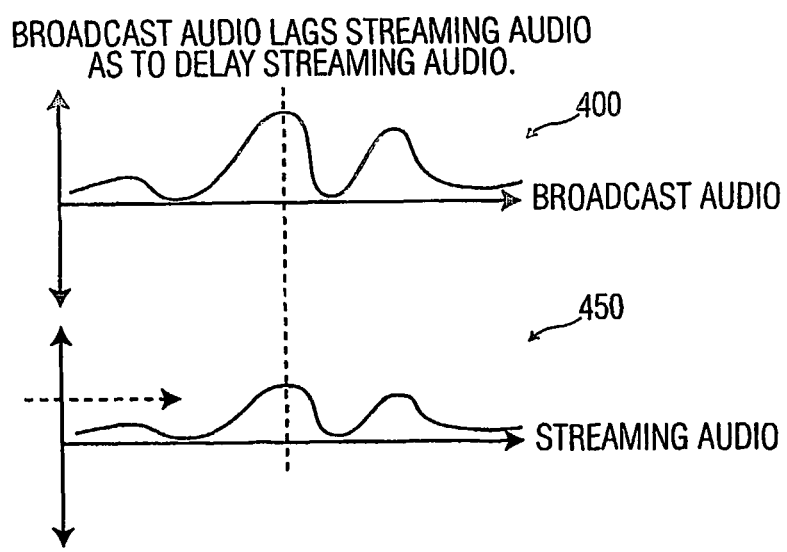
FIG. 5 is a diagram illustrating the spectral energy of the broadcast audio stream 500 and streaming audio stream 550 of FIG. 4 after synchronization, according to an illustrative embodiment of the present invention.

Consider the following example involving a college basketball game. FIG. 4 is a diagram illustrating the spectral energy of an audio stream from a broadcasted television program 400 and a streamed audio media service 450 both corresponding to the same program, according to an illustrative embodiment of the present invention. FIG. 5 is a diagram illustrating the spectral energy of audio stream 400 and streamed audio media service 450 of FIG. 4 after synchronization, according to an illustrative embodiment of the present invention. The spectral energy is represented in graphs, each having time represented by the horizontal axis and amplitude represented by the vertical axis.

A viewer may prefer to listen to the radio broadcast (as audio media service 450) of the event. The audio spectral content of the main voice will be different. Each announcer will comment on different events at semi-random times. The common information between the broadcasts will be the background noise, which are distinguished over the announcer due to sharp variations in the amplitudes of the audio waveforms (representing crowd noise). By assuming that both announcers are at the same event (media content), the background crowd noise will vary in relative power over time as events invoke a crowd response. A time window is selected for comparing the crowd responses in each audio waveform. The selection of the time window may be based on worse case expected delay difference used to sample audio waveforms from the audio stream and audio media service. A spectral power density curve in relation to time is generated from the sampling of the audio waveforms. The generation of the spectral power density curve is preferably performed as often as possible, depending on the processing load of the sampling system. However, such generation may also be performed at pre-defined or other times that are less that the maximum possible.

The spectral energy between the two audio waveforms may differ in amplitude, but the shape and relative energy should resemble each other (having a similar audio envelope). For our example, the peak sections are pink noise events such as crowd cheers 499 and the broadcast audio stream 400 lags the streamed audio media service 450. The solution is to delay the audio media service 450 until the correlation error between the two spectral charts is minimized over the given sampling window.

For streams that have embedded metadata tags, the information in these tags may be used to achieve synchronization. For example, if two media services have event codes embedded therein (e.g., in the case of DVDs chapter breaks may be used, this is but one type of many event codes as readily determined by one of ordinary skill in the related art), such metadata will be extracted and is used to adjust the delay lines to achieve synchronization. Optionally, if media services have time codes embedded therein, the time code information will be extracted (as metadata) and used to adjust the delay lines to achieve synchronization.

As another example of automatic synchronization, an audio fingerprint of known sounds (e.g., stadium charge sounds, scoring sounds, fight songs, etc.) in the audio waveforms may be used to align media services, streams, and the like. The incoming audio waveforms are continually matched against a "fingerprint" database. Such a fingerprint database may be included in, for example, storage device 118. When matches are found between the incoming streams and the audio fingerprints stored in the fingerprint database, a tag is inserted into the buffer (or other memory device) that identifies the tag. A correlation function will then be executed between two media services, based on the tags, to achieve synchronization. Synchronization will be considered to have occurred upon the minimization of a correlation error. Moreover, while the preceding is performed automatically, the user may be allowed to manually fine tune the automatic synchronization. It is to be appreciated audio fingerprints may readily added and/or deleted from the fingerprint database as is readily determined by one of ordinary skill in the related art. Alternatively, the length of time between the fingerprinted sounds in audio corresponding to each media service is determined; the playback of one of the media services is then delayed by the calculated length of time.

Figure 6:
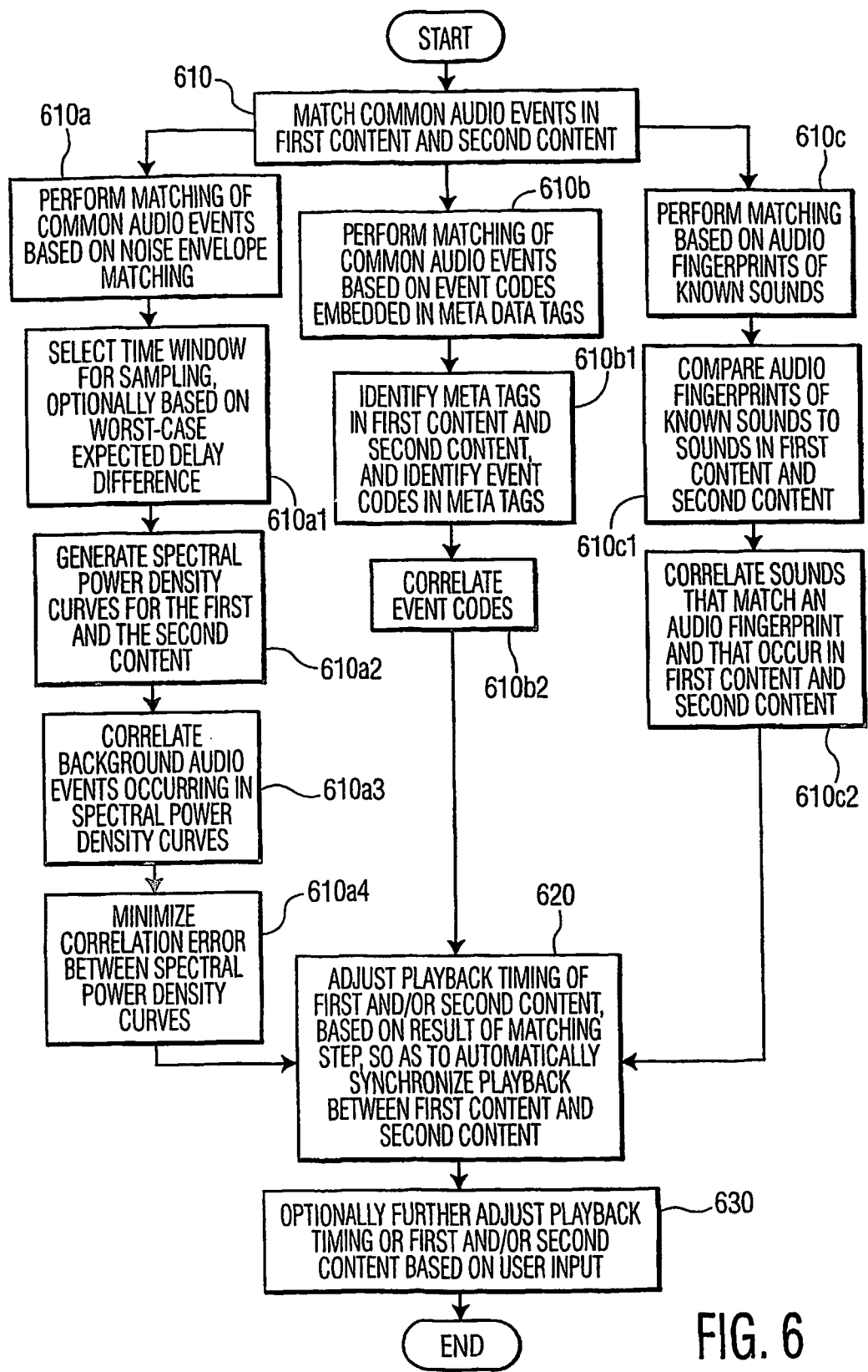
FIG. 6 is a flow diagram illustrating a method for synchronizing a playback between a video media service and an audio media service corresponding to the same media content but from different authoring sources, according to an illustrative embodiment of the present invention.

FIG. 6 is a flow diagram illustrating a method for synchronizing a playback between a first media service and a second media service corresponding to a same program but from different authoring sources, according to an illustrative embodiment of the present invention. The first media service and the second media service may include broadcast content, streaming content, a combination thereof, and any other type of content to which synchronization according to the present invention may be applied.

Common audio events (characteristics) in the first media service and the second media service are matched (step 610).

The playback timing of the first media service and/or the second media service is adjusted, based on a result of the matching step, so as to automatically synchronize the playback between the first media service and the second media service (step 620).

Moreover, the playback timing of the first media service and/or the second media service may be further adjusted based on a user input (step 630). The user input corresponds to increasing and/or decreasing a delay inserted in the playback timing of the first media service and/or the second media service.

It is to be appreciated that step 610 may include any of steps 610*a*, 610*b*, and/or 610*c* below.

At step 610*a*, matching is performed based on noise envelope matching. Step 610*a* may include steps 610*a*1 through 610*a*4. At step 610*a*1, a time window is selected for sampling the first media service and the second media service. The selection may be based on a worst-case expected delay difference between the first media service and the second media service. At step 610*a*2, spectral power density curves are generated for the first media service and the second media service. At step 610*a*3, background audio events occurring in the spectral power density curves are correlated for the first media service and the second media service. At step 610*a*4, a correlation error between spectral power density curves corresponding to the first media service and the second media service is minimized.

At step 610*b*, matching is performed based on event codes embedded in meta data tags that, in turn, are embedded in the first media service and the second media service. Step 610*b* may include steps 610*b*1 through 610*b*2. At step 610*b*1, meta tags are identified in the first media service and the second media service, and event codes are identified in the meta tags. At step 610*b*2, the event codes are correlated.

At step 610*c*, matching is performed based on audio fingerprints of renown sounds. Step 610*c* may include steps 610*c*1 through 610*c*2. At step 610*c*1, audio fingerprints of known sounds (that may be stored in a database of audio fingerprints) are compared to sounds in the first media service and the second media service. At step 610*c*2, sounds that match an audio fingerprint and that occur in the first media service and the second media service are correlated.

As an alternative of the present invention, an audio waveform corresponding to a media service would used to match an audio media service against the audio waveform corresponding to a video based media service, both media services are of the same content source. The video based media service would then be synchronized, using the process described above, with the audio-based media service.

A description will now be given of various implementation scenarios of the present invention, according to various illustrative embodiments of the present invention.

On an ATSC/DBS receiver, the delay line may be implemented by making a MPEG buffer a variable size. The user control would be implemented, for example, as a pair of buttons, or a rocker button, on the remote control. Visual indication of the relative setting of the delay would appear as an on-screen graphic or alphanumeric representation. The user increases the delay by pushing one of the buttons, and decreases the delay by pushing the other button. The on-screen graphic may be a bar graph that increases or decreases according to the current amount of delay inserted.

On an Internet streaming audio receiver, the delay line may be implemented by making an audio buffer a variable size. The user control would be implemented as an additional control on the units control panel or remote. Visual indication of the relative setting of the delay would appear as a graphic or alphanumeric on the units display.

On a ATSC/DBS/Browser capable television (with the ability to receive streaming content over the browser), adjustable delay lines may be implemented by either or both making the MPEG buffer a variable size, and by making the streaming audio buffer a variable size. The user control, if there is only one delay line in the system controls the length of that delay, but if there are two delay lines increases one delay and decreases the other delay. In either scenario, the user control would be implemented by two buttons or a rocker button on the remote control, and an on screen graphic or alphanumeric value indicating the relative delays between the two programs.

Although the illustrative embodiments have been described herein with reference to the accompanying drawings, it is to be understood that the present invention is not limited to those precise embodiments, and that various other changes and Modifications may be affected therein by one of ordinary skill in the related art without departing from the scope or spirit of the invention. All such changes and modifications are intended to be included within the scope of the invention as defined by the appended claims.

The invention claimed is:

1. A method for synchronizing playback between a first media service and a second media service, corresponding to a same media content, on a computing device, the method comprising:
   matching common audio characteristics in an audio signal of the first media service with corresponding audio characteristics in an audio waveform corresponding to the second media service based on codes embedded in meta data associated with the first media service and the second media service; and
   the computing device adjusting a playback timing of at least one of the first media service and the second media service, which is a different media service than the first media service, based on a result of said matching step, so as to synchronize the playback of the first media service and the second media service.

2. The method of claim 1, wherein said matching step matches the common audio characteristics in the audio signal of first media service and the audio waveform using noise envelope matching.

3. The method of claim 1, wherein said matching step matches the common audio characteristics in the audio signal of the first media service and the audio waveform using audio fingerprints of known sounds.

4. The method of claim 3, wherein the known sounds comprise at least one of a stadium charge sound, a scoring sound, and a song.

5. The method of claim 1, wherein said matching step comprises the step of selecting a time window for sampling the audio signal of the first media service and the audio wave form corresponding to the second media service, based on a worst case expected delay difference between the first media service and the second media service.

6. The method of claim 1, wherein said matching step comprises the step of generating a spectral power density curve for both the audio signal of the first media service and the audio waveform.

7. The method of claim 1, wherein the common audio characteristics are background audio events and said matching step comprises the step of correlating the background audio events occurring in the audio signal of the first media service and the audio waveform.

8. The method of claim 1, wherein said matching step comprises the step of minimizing a correlation error between spectral power density curves corresponding to the audio signal of the first media service and audio waveform.

9. The method of claim 1, wherein said matching step comprises:
   selecting a time window for sampling the audio signal of the first media service and an audio waveform corresponding to the second media service;
   generating spectral power density curves for the audio signal and the audio waveform;
   correlating background audio events occurring in the spectral power density curves for the audio signal and the audio waveform; and
   minimizing a correlation error between the spectral power density curves corresponding to the audio signal and the audio waveform.

10. The method of claim 1, wherein said matching step comprises:

comparing audio fingerprints of known sounds to sounds in audio signal of the first media service and the audio waveform corresponding to the second media service; and correlating sounds that match an audio fingerprint and that occur in both the audio signal and the audio waveform.

11. An apparatus for synchronizing a playback between a first media service and a second media service corresponding to a same media content, the apparatus comprising:

a sound-matching device for matching common audio characteristics in an audio signal of the first media service and in an audio waveform corresponding to the second media service, which is different than the first media service, said matching being performed based on codes embedded in meta data associated with the first media service and the second media service; and a variable delayer for adjusting a playback timing of at least one of the first media service and the second media service, based on an output of said sound-matching device, so as to synchronize the playback between the first media service and the second media service.

12. The apparatus of claim 1, wherein said sound-matching device matches the common audio events in the audio signal of first media service and the audio waveform using noise envelope matching.

13. The apparatus of claim 1, wherein said sound-matching device matches the common audio events in the audio signal of the first media service and the audio waveform using audio fingerprints of known sounds.

14. The apparatus of claim 1, wherein said sound-matching device selects a time window for sampling the audio signal of the first media service and the audio waveform, based on a worst case expected delay difference between the audio signal and the audio waveform.

15. The apparatus of claim 1, wherein said sound-matching device generates a spectral power density curve for both the audio signal of the first media service and the audio waveform.

16. The apparatus of claim 1, wherein said sound-matching device minimizes a correlation error between spectral power density curves corresponding to the audio signal of the first media service and audio waveform.

17. The apparatus of claim 1, wherein said sound-matching device selects a time window for sampling the audio signal of the first media service and the audio waveform corresponding to the second media service, generates spectral power density curves for the audio signal and the audio waveform, correlates background audio events occurring in the spectral power density curves for the audio signal and the audio waveform, and minimizes a correlation error between the spectral power density curves corresponding to the audio signal and the audio waveform.

18. The apparatus of claim 1, wherein said sound-matching device compares audio fingerprints of known sounds to the audio characteristics in the audio signal of the first media service and the audio waveform, and correlates sounds that match an audio fingerprint and that occur in both the audio signal and the audio waveform.

19. The apparatus of claim 1, wherein the first media content is of a first authoring source and the second media content is of a second authoring source.

* * * * *